US011592375B2

(12) United States Patent
Conti et al.

(10) Patent No.: US 11,592,375 B2
(45) Date of Patent: Feb. 28, 2023

(54) COLLISION MITIGATION APPARATUS MATERIAL TESTING SYSTEMS HAVING COLLISION MITIGATION APPARATUS

(71) Applicant: Illinois Tool Works Inc., Glenview, IL (US)

(72) Inventors: Richard A. Conti, North Attleboro, MA (US); Jaron D. Burnworth, Volant, PA (US)

(73) Assignee: Illinois Tool Works Inc., Glenview, IL (US)

( * ) Notice: Subject to any disclaimer, the term of this patent is extended or adjusted under 35 U.S.C. 154(b) by 249 days.

(21) Appl. No.: 16/832,708

(22) Filed: Mar. 27, 2020

(65) Prior Publication Data

US 2020/0309651 A1   Oct. 1, 2020

Related U.S. Application Data

(60) Provisional application No. 62/825,424, filed on Mar. 28, 2019.

(51) Int. Cl.
*G01N 3/02* (2006.01)
*G01N 3/20* (2006.01)
*G01N 3/08* (2006.01)

(52) U.S. Cl.
CPC ....... *G01N 3/02* (2013.01); *G01N 2203/0016* (2013.01); *G01N 2203/04* (2013.01)

(58) Field of Classification Search
CPC .... G01N 3/38; G01N 3/08; G01N 2203/0016; G01N 3/10; G01N 3/06; G01N 3/062;
(Continued)

(56) References Cited

U.S. PATENT DOCUMENTS 9,726,657 B2 * 8/2017 Saleem ................... G01N 3/08
10,012,575 B2   7/2018 Ganser
(Continued)

FOREIGN PATENT DOCUMENTS

EP   2631496      8/2013
JP   H1123434    1/1999
(Continued)

OTHER PUBLICATIONS

LD Series Operation Manual, Dual col. Test Stand, Models LD5, LD10, LD30, LD50, LD100 2017 (20 pgs).
(Continued)

*Primary Examiner* — Brandi N Hopkins
(74) *Attorney, Agent, or Firm* — McAndrews Held & Malloy, Ltd.

(57) ABSTRACT

An example material testing system includes: a crosshead configured to be actuated to transfer testing force to a test specimen during a material test; an actuator configured to actuate the crosshead and to apply the testing force to the crosshead; a force sensor configured to measure force applied by the crosshead to the specimen; and a control processor configured to: determine a reference force range based on a first force measurement from the force sensor in response to initiation of movement of the crosshead; and in response to a second force measurement by the force sensor that is outside of the reference force range, controlling the actuator to apply a braking force to the crosshead.

20 Claims, 5 Drawing Sheets

(58) Field of Classification Search
CPC ........ G01N 3/064; G01N 3/066; G01N 3/068; G05B 6/02
See application file for complete search history.

(56) References Cited

U.S. PATENT DOCUMENTS

2004/0020276 A1* 2/2004 Kwon ................. G01N 3/48
73/81
2013/0055823 A1* 3/2013 Kawano .............. G01N 3/08
73/805

FOREIGN PATENT DOCUMENTS

JP 2012042321 3/2012
JP 2018017579 2/2018

OTHER PUBLICATIONS

Lloyd Instruments Ltd, Service Manual for the LS1, FT1, TA1, LS2K5 and LS5 Materials Testing Machines Issue 4.0—Nov. 2014(144 pgs).
Int'l Search Report and Written Opinion Appln No. PCT/2020/025636 dated Jun. 16, 2020.

* cited by examiner

COLLISION MITIGATION APPARATUS MATERIAL TESTING SYSTEMS HAVING COLLISION MITIGATION APPARATUS

RELATED APPLICATIONS

The present application claims the benefit of U.S. Patent Application Ser. No. 62/825,425, filed Mar. 28, 2019, entitled "COLLISION MITIGATION APPARATUS MATERIAL TESTING SYSTEMS HAVING COLLISION MITIGATION APPARATUS." The entirety of U.S. Patent Application Ser. No. 62/825,425 is expressly incorporated herein by reference.

BACKGROUND

This disclosure relates generally to materials testing, and more particularly, to collision mitigation apparatus and material testing systems having collision mitigation apparatus.

Universal testing machines are used to perform mechanical testing, such as compression strength testing or tension strength testing, on materials or components. While performing dynamic testing on materials, typically a sample of the material is tested through subjecting the sample of the material to a variety of test loads. For example, the sample of the material may be subjected to tensile forces or compressive forces. The sample of material may also be subjected to torsion forces. It is possible that during certain testing procedures the sample of the material is subjected simultaneously to tensile, compressive and torsion forces. In order to perform these material testing procedures on a sample of the material, the sample of material must be held securely in the material testing machine, sometimes referred to as the material testing system, that is designed to perform the material testing procedures on the sample of the material. An operator or system may control moving components of a material testing system to move to appropriate positions, such as a position for mounting a test specimen.

SUMMARY

Collision mitigation apparatus and material testing systems having collision mitigation apparatus are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
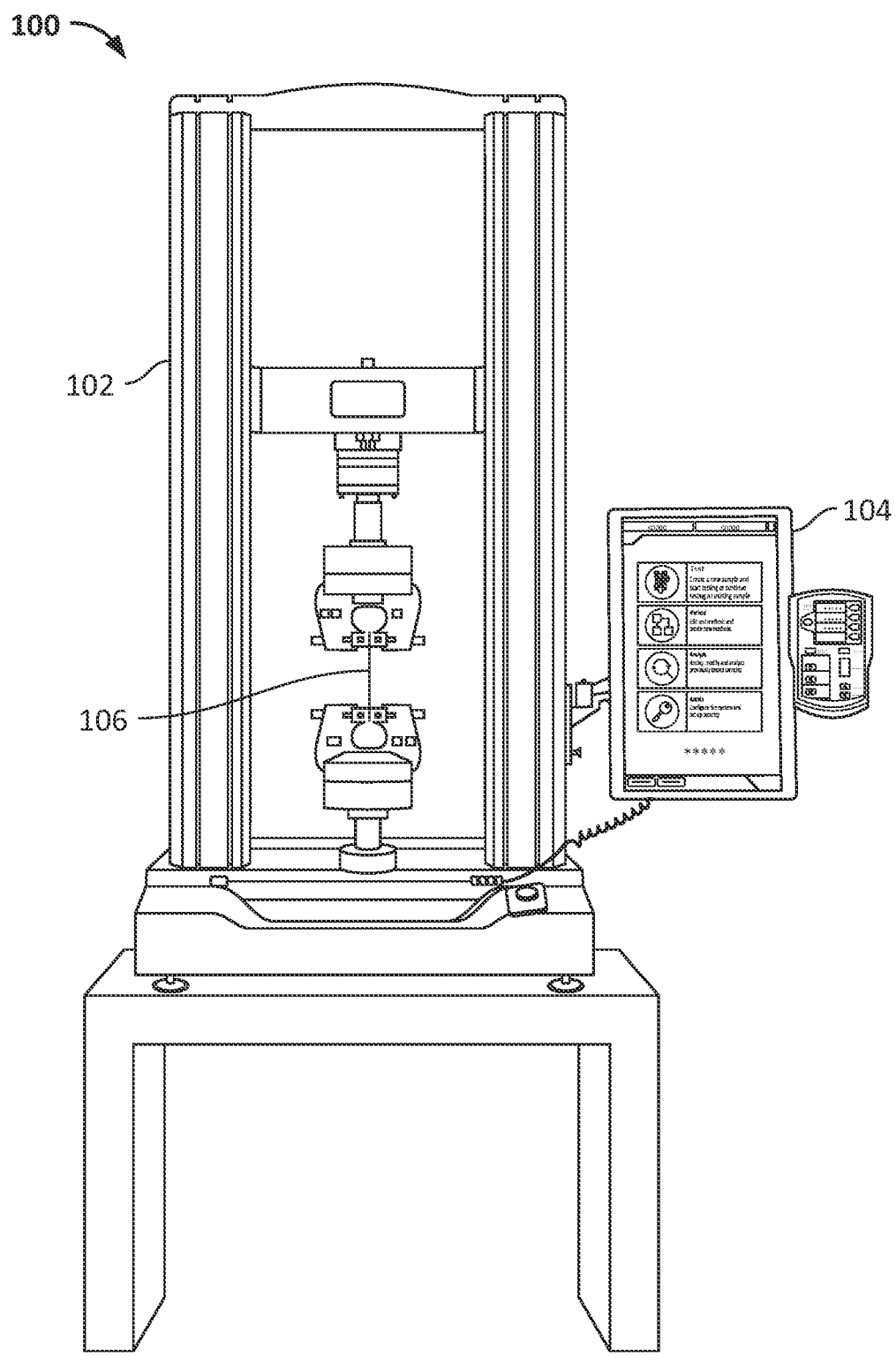
FIG. 1 is an example testing device to perform mechanical property testing, in accordance with aspects of this disclosure.

Material testing systems, including material testing systems that apply tension, compression, and/or torsion, include one or more components that incur displacement and/or load bearing to apply and/or measure stresses on a test specimen. As such, material testing systems include one or more moving components (e.g., a crosshead) that are configured to move toward and away from other components, which introduces the possibility for collision between a moving component and another component of the material testing system.

In some situations, operators may accidentally cause parts of their material testing system to collide when using the jog buttons to move the crosshead of the frame or when returning to a predetermined location (e.g., zero displacement).

Disclosed example systems, methods, and apparatus stop movement of components when a collision is detected by using the actuator(s) of the moving component(s) to apply a reversing force as a brake. By improving the speed at which a collision is detected and/or mitigated, disclosed example systems, methods, and apparatus mitigate collisions quickly enough to reduce the likelihood of damage to a materials testing frame, load cells, fixtures, and/or specimens, compared to conventional material testing systems.

In some examples, a control processor uses primary force measurements and/or displacement measurements that are already built into the system as the input(s) to detect a collision and/or mitigate the collision. The control processor detects a relative force change as a collision criterion, so that collision detection functions even when an operator does not balance or zero out the force measurement to reflect true force on the specimen. In some examples, the control processor distinguishes loaded motion from free motion, and applies the collision detection and mitigation techniques only when free motion is detected. Such example systems enable the operator to use Jog and/or Return functions to unload a system that was already loaded, without triggering the collision mitigation.

When a collision is detected, example systems, methods, and apparatus use the actuator output (e.g., a servo output) to apply a brake for a short duration. Example actuator braking may involve controlling the actuator to actuate in a direction opposite the direction of movement. To increase responsiveness, disclosed examples control the actuator by bypassing a normal control loop (e.g., a closed-loop control system). Example systems, methods, and apparatus may determine a braking time and/or apply the brake until a threshold velocity is reached. The threshold velocity may be preset and/or determined based on the speed at the time of collision.

As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

Disclosed example material testing systems include a crosshead configured to be actuated to transfer testing force to a test specimen during a material test, an actuator configured to actuate the crosshead and to apply the testing force to the crosshead, a force sensor configured to measure force applied by the crosshead to the specimen, and a control processor. The control processor is configured to determine a reference force range based on a first force measurement from the force sensor in response to initiation of movement of the crosshead and, in response to a second force measurement by the force sensor that is outside of the reference force range, control the actuator to apply a braking force to the crosshead.

In some example material test systems, the control processor is configured to determine the reference force range as a collision reference force range based on a tolerance range and the first force measurement. In some example material test systems, the control processor is configured to determine a free motion force range based on a second tolerance range and the first force measurement, and the control processor is configured to control the actuator to apply the braking force further in response to the second force measurement being outside of the free motion force range.

In some example material test systems, the control processor is configured to control the actuator to apply the braking force further in response to determining that the second force measurement is not less than a third force measurement taken prior to the second force measurement. In some example material test systems, the control processor is configured to determine a reference displacement of the crosshead based on a displacement measurement, and the control processor is configured to control the actuator to apply the braking force further in response to determining that a difference between a displacement measurement and the reference displacement is more than a threshold.

In some example material test systems, the control processor is configured to control the actuator to apply the braking force further in response to determining that a velocity of the crosshead is at least a threshold velocity. In some example material test systems, the control processor is configured to control the actuator to apply the braking force by controlling the actuator to actuate in an opposite direction of a crosshead velocity. In some examples, the control processor is configured to: determine an end goal velocity and, in response to determining that the crosshead velocity has reached the end goal velocity, control the actuator to remove the braking force.

In some example material test systems, the control processor is configured to control the actuator to move the crosshead to a displacement value observed prior to detecting second force measurement.

Disclosed example methods to control a material testing system involve: controlling an actuator to actuate to transfer testing force to a test specimen during a material test; measuring, via a force sensor, a force applied by the crosshead to the specimen; determining, with a control processor, a reference force range based on a first force measurement from the force sensor in response to initiation of movement of the crosshead; and in response to a second force measurement by the force sensor that is outside of the reference force range, controlling the actuator to apply a braking force to the crosshead.

Some example methods further involve determining the reference force range as a collision reference force range based on a tolerance range and the first force measurement. Some example methods further involve determining a free motion force range based on a second tolerance range and the first force measurement, in which the controlling of the actuator to apply the braking force is further in response to the second force measurement being outside of the free motion force range.

In some example methods, the controlling of the actuator to apply the braking force is further in response to determining that the second force measurement is not less than a third force measurement taken prior to the second force measurement. Some example methods further involve determining a reference displacement of the crosshead based on a displacement measurement, in which the controlling of the actuator to apply the braking force is further in response to determining that a difference between a displacement measurement and the reference displacement is more than a threshold.

In some example methods, the controlling of the actuator to apply the braking force is further in response to determining that a velocity of the crosshead is at least a threshold velocity. In some example methods, the controlling of the actuator to apply the braking force involves controlling the actuator to actuate in an opposite direction of a crosshead velocity. Some example methods further involve determining an end goal velocity and, in response to determining that the crosshead velocity has reached the end goal velocity, controlling the actuator to remove the braking force. Some example methods further involve controlling the actuator to move the crosshead to a displacement value observed prior to detecting second force measurement.

FIG. 1 is an example material testing system 100 to perform mechanical property testing. The example material testing system 100 may be, for example, a universal testing system capable of static mechanical testing. The material testing system 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally, or alternatively, the material testing system 100 may perform dynamic testing.

The example material testing system 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106. While the example test fixture 102 is illustrated as a dual column fixture, other fixtures may be used, such as single-column test fixtures.

The example computing device 104 may be used to configure the test fixture 102, control the test fixture 102, and/or receive measurement data (e.g., transducer measurements such as force and displacement) and/or test results (e.g., peak force, break displacement, etc.) from the test fixture 102 for processing, display, reporting, and/or any other desired purposes.

Figure 2:
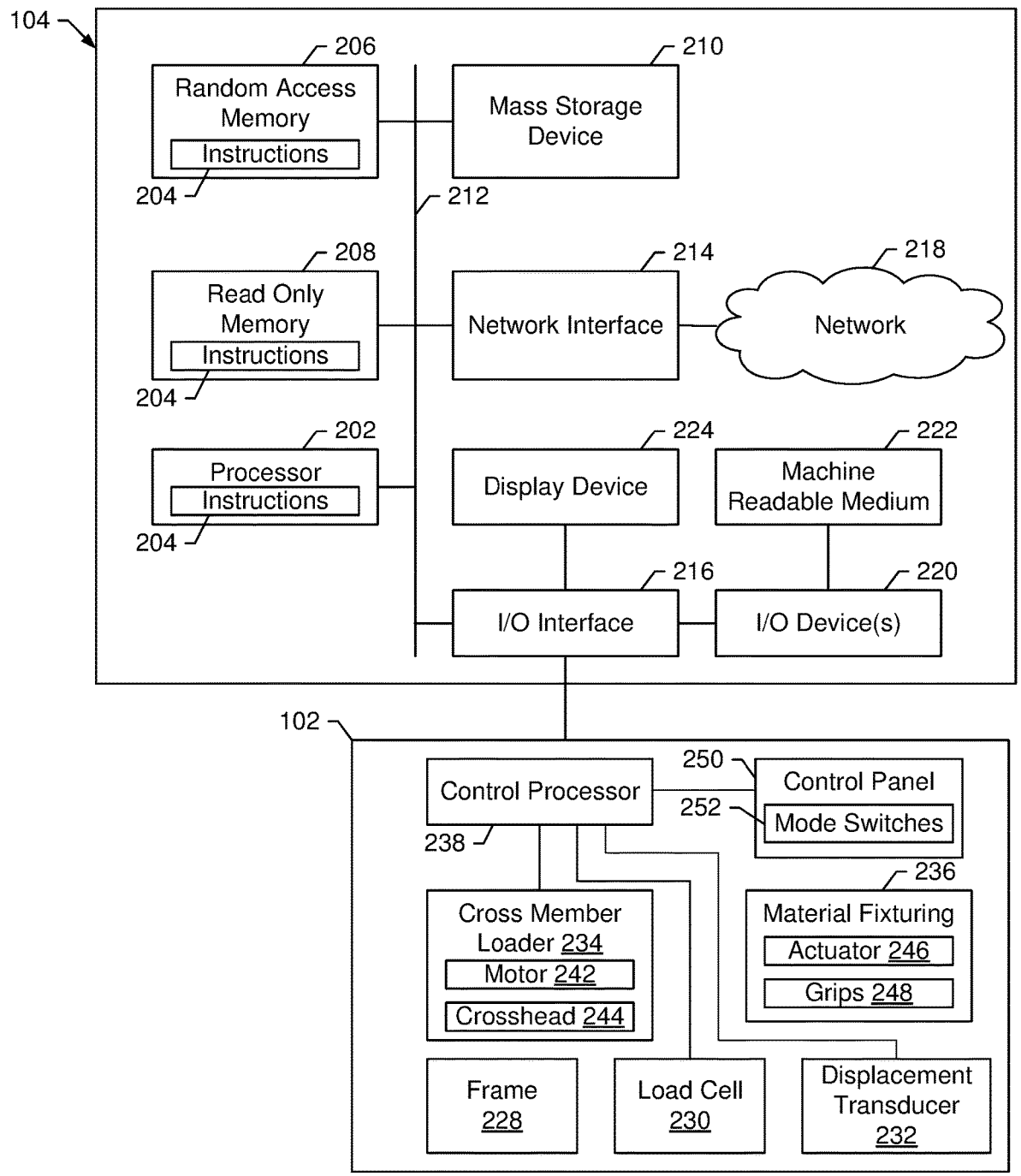
FIG. 2 is a block diagram of an example implementation of the testing device of FIG. 1.

FIG. 2 is a block diagram of an example implementation of the material testing system 100 of FIG. 1. The example material testing system 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 104 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example material testing system 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 104 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example material testing system 100 of FIG. 1 further includes the test fixture 102 coupled to the computing device 104. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 and/or to the I/O interface 216 via a wired or wireless connection (e.g., Ethernet, Wi-Fi, etc.), either directly or via the network 218.

The test fixture 102 of FIG. 2 includes a frame 228, a load cell 230, a displacement transducer 232, a cross-member loader 234, material fixtures 236, and a control processor 238. The frame 228 provides rigid structural support for the other components of the test fixture 102 that perform the test. The load cell 230 measures force applied to a material under test by the cross-member loader 234 via the material fixtures 236. The cross-member loader 234 applies force to the material under test, while the material fixtures 236 (which include grips 248) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the material testing system 100 include electric motors, pneumatic actuators, hydraulic actuators, piezoelectric actuators, relays, and/or switches.

While the example test fixture 102 uses a motor 242, such as a servo or direct-drive linear motor, other systems may use different types of actuators. For example, hydraulic actuators, pneumatic actuators, and/or any other type of actuator may be used based on the requirements of the system.

Example grips 248 include compression platens, jaws or other types of fixtures, depending on the mechanical property being tested and/or the material under test. The grips 248 may be manually configured, controlled via manual input, and/or automatically controlled by the control processor 238. The crosshead 244 and the grips 248 are operator-accessible components.

The example material testing system 100 of FIG. 2 may further include one or more control panels 250, including one or more mode switches 252. The mode switches 252 may include buttons, switches, and/or other input devices located on an operator control panel. For example, the mode switches 252 may include buttons that control the motor 242 to jog (e.g., position) the crosshead 244 at a particular position on the frame 228, switches (e.g., foot switches) that control the grip actuators 246 to close or open the pneumatic grips 248, and/or any other input devices to control operation of the test fixture 102.

The example control processor 238 communicates with the computing device 104 to, for example, receive test parameters from the computing device 104 and/or report measurements and/or other results to the computing device 104. For example, the control processor 238 may include one or more communication or I/O interfaces to enable communication with the computing device 104. The control processor 238 may control the cross-member loader 234 to increase or decrease applied force, control the fixture(s) 236 to grasp or release a material under test, and/or receive measurements from the displacement transducer 232, the load cell 230 and/or other transducers.

Figure 3A:
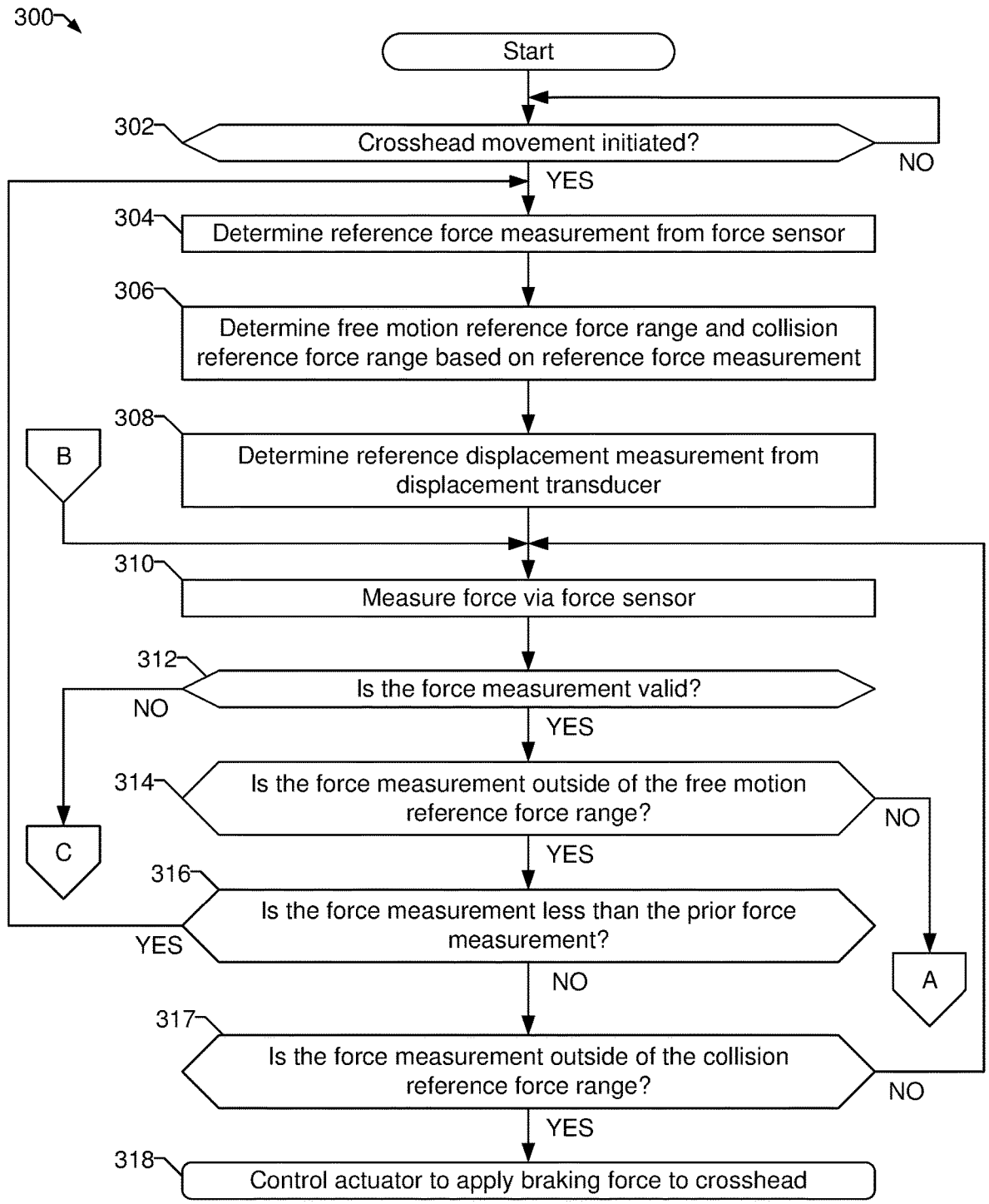
FIGS. 3A and 3B illustrate a flowchart representative of example machine readable instructions which may be executed by the control processor of FIG. 2 to detect and mitigate a collision within the testing device of FIGS. 1 and 2.
Figure 3B:
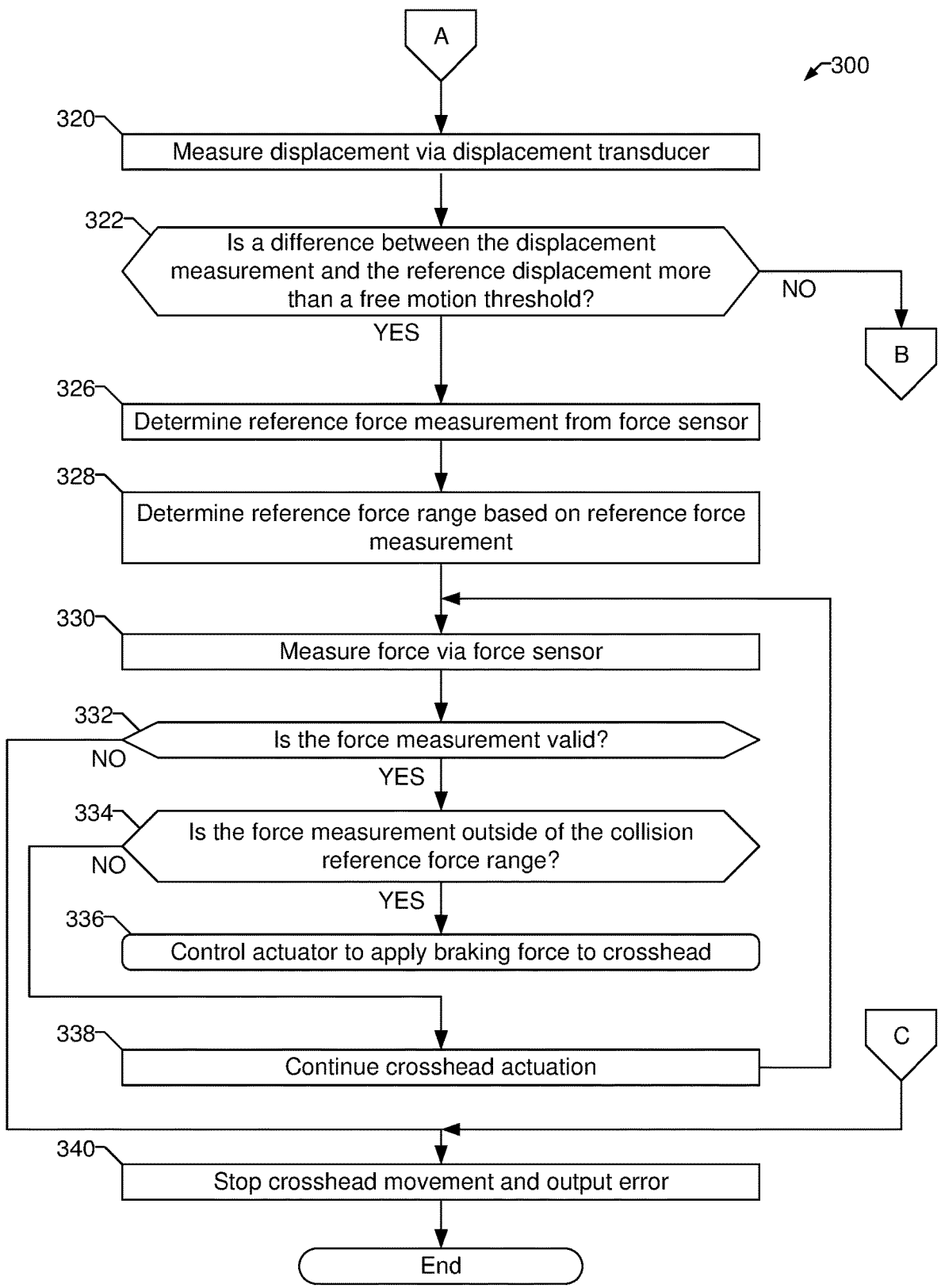
Figure 4:
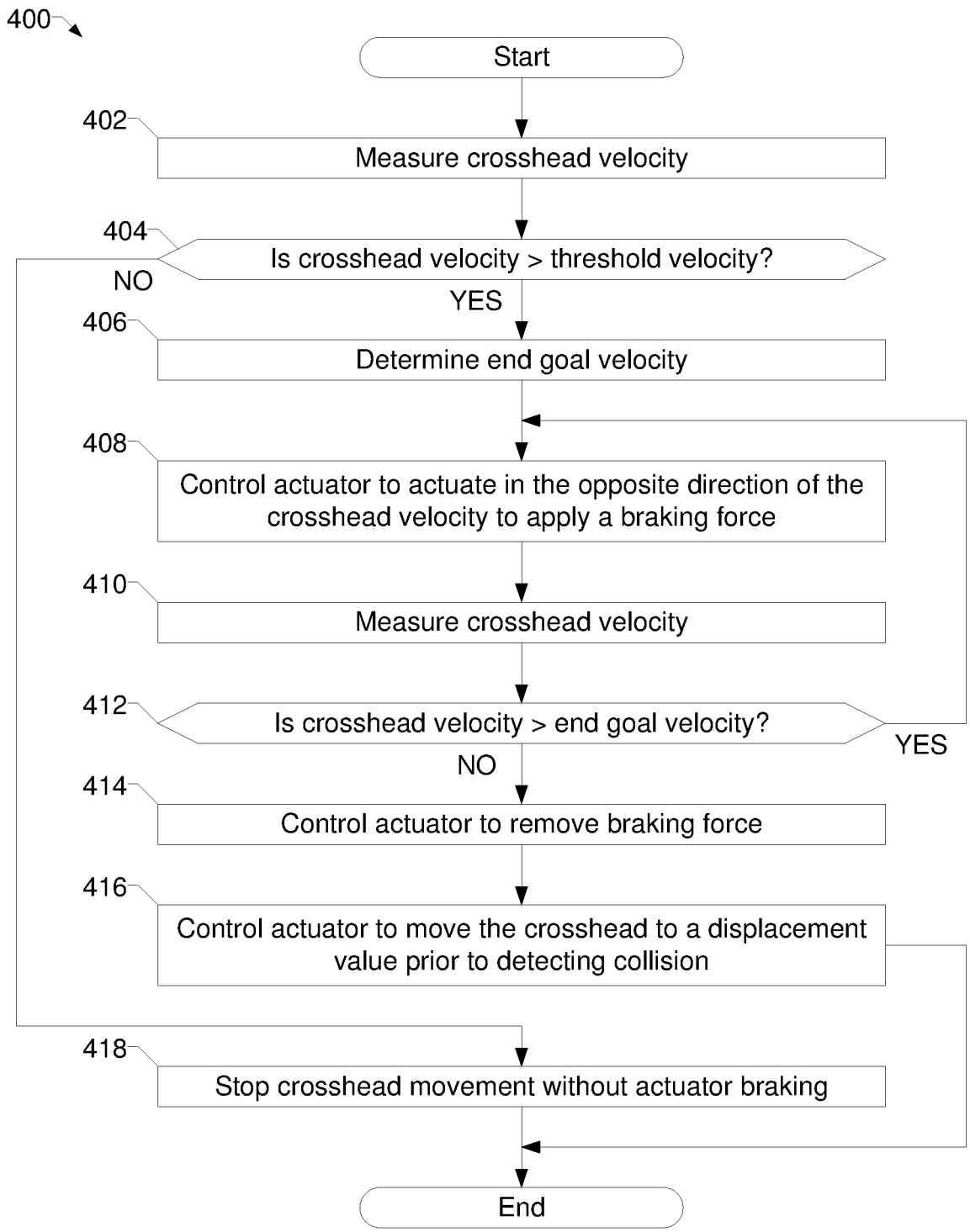
FIG. 4 is a flowchart representative of example machine readable instructions which may be executed by the control processor of FIG. 2 to mitigate a collision within the testing device of FIGS. 1 and 2.

The example control processor 238 is configured to implement a collision mitigation process when a collision is detected while the crosshead 244 is moving. For example, movement of the crosshead 244 by an inattentive operator may result in one set of the grips 248 attached to the crosshead 244 striking another set of the grips 248. To detect a collision, the control processor 238 monitors the load cell 230 as a force measurement sensor. When the control processor 238 identifies a change in relative force output by the load cell 230 (e.g., compared to an initial force measurement at a beginning of movement of the crosshead 244), the control processor 238 controls the motor 242 (or other actuator coupled to the crosshead 244) to apply a braking force to the crosshead 244 to quickly reduce a speed and mitigate the force on the components of the test fixture 102 caused by the collision. FIGS. 3A, 3B, and 4 disclosed below describe an example process that may be performed by the control processor 238 to detect and mitigate collision.

FIGS. 3A and 3B show a flowchart representative of example machine readable instructions 300 which may be executed by the control processor 238 of FIG. 2 to detect and mitigate a collision within the test fixture 102 of FIGS. 1 and 2.

At block 302, the control processor 238 determines whether movement of the crosshead 244 has been initiated. For example, crosshead movement may be initiated by an operator pushing a "jog" button (e.g., one of the mode switches 252 and/or one of the I/O devices 220 of FIG. 2) and/or by the control processor 238 as part of a programmed movement (e.g., returning the crosshead 244 to a predetermined position following the end of a material test). If crosshead movement has not been initiated (block 302), the control processor 238 returns control to block 302 to continue checking for crosshead movement.

When crosshead movement has been initiated, at block 304, the control processor 238 determines a reference force measurement from a force sensor. For example, the force measurement may be an output of the load cell 230 held by the crosshead 244. at block 306, the control processor 238 determines a free motion reference force range and a collision reference force range based on the reference force measurement. For example, the control processor 238 may apply a first force tolerance range to the reference force measurement to determine the free motion reference force range, and apply a second force tolerance range to determine the collision reference force range. In the example of FIGS. 3A and 3B, the first force tolerance range is a smaller range than the second force tolerance range to accommodate the unloading of highly compliant (e.g., stretchy) specimens. The first and second force tolerance ranges can be symmetric or asymmetric with respect to the reference force measurement.

At block 308, the control processor 238 determines a reference displacement measurement based on a measurement or data received from the displacement transducer 232. For example, the displacement transducer 232 may measure a current position, or displacement (e.g., relative to a predetermined location on the frame 228), of the crosshead 244.

At block 310, the load cell 230 measures a force. For example, the load cell 230 may measure a force on the material fixturing 236 and/or the grips 248 and provide the measurement to the control processor 238. Depending on the state of the test fixture 102 (e.g., gripping an intact specimen, gripping a broken specimen, not gripping a specimen), the load cell 230 may measure an unloaded force, a tension load, or a compression load.

At block 312, the control processor 238 determines whether the force measurement that has been performed is valid. For example, the control processor 238 may have one or more criteria with which the control processor 238 may evaluate the force measurement for validity, such as whether the value is within a previously determined valid range and/or whether a calibration of the load cell 230 is still valid. If the force measurement is valid (block 312), at block 314 the control processor 238 determines whether the measured force parameter is outside of the free motion reference force range. The free motion reference force range may be selected to indicate a change in force at the load cell 230 (and, by extension, the material fixturing 236) that is indicative of motion that is loaded motion (e.g., not free motion).

If the force measurement is outside of the free motion reference force range (block 314), at block 316 the control processor 238 determines whether the force measurement parameter is less (e.g., closer to zero) than the prior (e.g., most recent) force measurement. For example, the control processor 238 may determine whether the measured force by the load cell 230 is increasing, decreasing, or remaining constant. Because force measurements can have positive or negative values, the example control processor 238 may consider a force magnitude that is closer to zero than the prior magnitude to be less than the prior magnitude. If the force measurement magnitude is less (e.g., closer to zero) than the prior force measurement (block 316), control returns to block 304 in order to determine the reference force measurement from the force sensors.

On the other hand, if the force measurement magnitude is not less (e.g., closer to zero) than the prior force measurement (block 316), at block 317 the control processor 238 determines whether the force measurement is outside of the collision reference force range. The collision reference force range may be selected to indicate a change in force at the load cell 230 (and, by extension, the material fixturing 236) that is indicative of a collision between of components in the test fixture 102. If the force measurement is not outside of the collision reference force range (block 317), control returns to block 310 to continue monitoring the force measurements.

On the other hand, if the force measurement is outside of the collision reference force range (block 317), at block 318 the control processor 238 controls the actuator of the crosshead 244 (e.g., the motor 242) to apply a braking force to the crosshead 244 to stop the crosshead movement more quickly than simply stopping control of the actuator. An example process to implement block 318 to control the actuator to apply the braking force is disclosed below with reference to FIG. 4. After applying the braking force (block 318), the example instructions 300 may end.

Turning to FIG. 3B, if the measure forced parameter is not outside the reference force range (block 314), at block 320 the control processor 238 measures the displacement parameter via the displacement transducer 232. For example, the control processor 238 may determine a present position of the crosshead 244.

At block 322, the control processor 238 determines whether the difference between the measured displacement and the reference displacement are more than the value of a free motion threshold. The free motion threshold may be a change in displacement that indicates that movement of the crosshead 244 is not loaded movement (e.g., is not applying or reducing load to a test specimen). If the difference between the measured displacement and the reference displacement is not more than the free motion threshold, control returns to block 310 to continue monitoring the force.

If the difference is more than the free motion threshold (block 322), at block 326 the control processor 238 determines the value of the reference force parameter the force sensor (e.g., the load cell 230). At block 328, the control processor 238 determines the reference force range based on reference force measurement. Blocks 326 and 328 may be performed in a similar or identical manner to blocks 304 and 306 of FIG. 3A.

At block 330, the control processor 238 measures the force (e.g., a force on the crosshead 244) via the force sensor (e.g., the load cell 230). At block 332, the control processor 238 determines whether the measured force measurement parameter is valid. Block 332 may be performed in a similar or identical to block 312 of FIG. 3A.

If force measurement is valid (block 332), at block 334 the control processor 238 determines whether the force measurement parameter is outside the reference force range.

If the force measurement parameter is outside of the reference force range (block 334), at block 336 the control processor 238 controls the actuator of the crosshead 244 (e.g., the motor 242) to apply a braking force to the crosshead 244 to stop the crosshead movement more quickly than simply stopping control of the actuator. An example process to implement block 336 to control the actuator to apply the braking force is disclosed below with reference to FIG. 4. After applying the braking force (block 336), the example instructions 300 may end.

On the other hand, if the force measurement is not outside of the reference force range (block 334), at block 338 the control processor 238 permits crosshead actuation to continue, and control returns to block 330 to continue monitoring the force on the crosshead 244 via force sensors.

If the control processor 238 determines that the force measurement is not valid (block 312 or 332), at block 340 the control processor 238 stops the crosshead movement and generates an output error message or error signal. The example instructions 300 then end. At any time during execution of the instructions 300 to perform collision detection, the crosshead motion could be stopped by the cessation of the input causing the motion (e.g., the operator releasing the Jog button, the crosshead coming to the end of the return motion, etc.). Cessation of motion control would cause a normal cessation of movement of the crosshead 244 and may cause the instructions 300 to end.

FIG. 4 is a flowchart representative of example machine readable instructions 400 which may be executed by the control processor 238 of FIG. 2 to mitigate a collision within the testing device of FIGS. 1 and 2. The example instructions 400 may be performed by the control processor 238 to implement block 318 and/or block 336 of FIGS. 3A and 3B. The instructions 400 are described below as invoked by the control processor 238 in response to determining that the force measurement is not less than the prior force measurement (block 316) or that the force measurement is outside of the reference force range (block 334).

At block 402, the example displacement transducer 232 measures a crosshead velocity. For example, the displacement transducer 232 and/or control processor 238 may compare sequential displacement measurements made by the displacement transducer 232, and corresponding times, to determine the resulting velocity.

At block 404, the control processor 238 determines whether the measured crosshead velocity is larger than the threshold velocity. If the crosshead velocity is greater than the threshold velocity (block 404), at block 406 the control processor 238 determines an end goal velocity. The end goal velocity is representative of a velocity at which the braking control can be stopped. An example end goal velocity may be a predetermined fraction of the crosshead velocity measured at block 402, and/or a predetermined constant velocity threshold near zero. In some examples, the end goal velocity is selected to provide the control processor 238 with sufficient time to cease control of the actuator (e.g., the motor 242) to avoid reversing movement of the crosshead 244.

At block 408, the control processor 238 controls the actuator (e.g., the motor 242) to actuate in the opposite direction of the crosshead velocity to apply the braking force. The control processor 238 may exercise control of the actuator outside of the typical actuator control loop to reduce (e.g., minimize) the response time of the braking action. For example, a proportional-integral-derivative (PID) control loop or other closed-loop control schemes may cause unacceptable delays in effecting the braking action. Thus, the example control processor 238 may invoke a process or routine to bypass such a control loop when performing the braking action.

At block 410, the control processor 238 measures the crosshead velocity. Block 410 may be performed in a similar or identical manner to block 402. At block 412, the control processor 238 determines whether the crosshead velocity is greater than the end goal velocity. If the measured crosshead velocity is greater than the end goal velocity (block 412), control returns to block 408 to controlling the actuator to apply the braking force.

If the crosshead velocity parameter is not greater than the end goal velocity (block 412), at block 414 the control processor 238 controls the actuator to remove the braking force. For example, the control processor 238 may reestablish the normal control loop of the actuator with a target speed of zero. At block 416, the control processor 238 controls the actuator to move the crosshead to a displacement value observed prior to detecting the collision (e.g., at block 318, 336). For example, the control processor 238 may control the actuator to move the crosshead 244 to a location at which there is expected to be no or little contact with another object. In other examples, the control processor 238 does not attempt to move the crosshead 244 after performing the braking.

If the measured crosshead velocity parameter is not larger than the threshold velocity (block 404), at block 418 the control processor 238 controls the actuator to stop the crosshead movement without using actuator braking (e.g., using the normal control loop of the actuator).

After moving the crosshead to a displacement value (block 416), or stopping the crosshead movement (block 418), the example instructions 400 end.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A material testing system, comprising:
   a crosshead configured to be actuated to transfer testing force to a test specimen during a material test;
   an actuator configured to actuate the crosshead and to apply the testing force to the crosshead;
   a force sensor configured to measure force applied by the crosshead to the specimen; and
   a control processor configured to:
      determine a reference force range based on a first force measurement from the force sensor in response to initiation of movement of the crosshead; and
      in response to a second force measurement by the force sensor that is outside of the reference force range, control the actuator to apply a braking force to the crosshead.

2. The material test system as defined in claim 1, wherein the control processor is configured to determine the reference force range as a collision reference force range based on a tolerance range and the first force measurement.

3. The material test system as defined in claim 2, wherein the control processor is configured to determine a free motion force range based on a second tolerance range and the first force measurement, wherein the control processor is configured to control the actuator to apply the braking force further in response to the second force measurement being outside of the free motion force range.

4. The material test system as defined in claim 3, wherein the control processor is configured to control the actuator to apply the braking force further in response to determining that the second force measurement is not less than a third force measurement taken prior to the second force measurement.

5. The material test system as defined in claim 4, wherein the control processor is configured to determine a reference displacement of the crosshead based on a displacement measurement, wherein the control processor is configured to control the actuator to apply the braking force further in response to determining that a difference between a displacement measurement and the reference displacement is more than a threshold.

6. The material test system as defined in claim 1, wherein the control processor is configured to control the actuator to apply the braking force further in response to determining that a velocity of the crosshead is at least a threshold velocity.

7. The material test system as defined in claim 1, wherein the control processor is configured to control the actuator to apply the braking force by controlling the actuator to actuate in an opposite direction of a crosshead velocity.

8. The material test system as defined in claim 7, wherein the control processor is configured to:
   determine an end goal velocity; and
   in response to determining that the crosshead velocity has reached the end goal velocity, control the actuator to remove the braking force.

9. The material test system as defined in claim 1, wherein the control processor is configured to control the actuator to move the crosshead to a displacement value observed prior to detecting second force measurement.

10. The material test system as defined in claim 1, wherein the control processor is configured to determine a reference displacement of the crosshead based on a displacement measurement, wherein the control processor is configured to control the actuator to apply the braking force further in response to determining that a difference between a displacement measurement and the reference displacement is more than a threshold.

11. A method to control a material testing system, the method comprising:
   controlling an actuator to actuate to transfer testing force to a test specimen during a material test;
   measuring, via a force sensor, a force applied by the crosshead to the specimen;
   determining, with a control processor, a reference force range based on a first force measurement from the force sensor in response to initiation of movement of the crosshead; and
   in response to a second force measurement by the force sensor that is outside of the reference force range, controlling the actuator to apply a braking force to the crosshead.

12. The method as defined in claim 11, further comprising determining the reference force range as a collision reference force range based on a tolerance range and the first force measurement.

13. The method as defined in claim 12, further comprising determining a free motion force range based on a second tolerance range and the first force measurement, wherein the controlling of the actuator to apply the braking force is further in response to the second force measurement being outside of the free motion force range.

14. The method as defined in claim 13, wherein the controlling of the actuator to apply the braking force is further in response to determining that the second force measurement is not less than a third force measurement taken prior to the second force measurement.

15. The method as defined in claim 14, further comprising determining a reference displacement of the crosshead based on a displacement measurement, wherein the controlling of the actuator to apply the braking force is further in response to determining that a difference between a displacement measurement and the reference displacement is more than a threshold.

16. The method as defined in claim 11, wherein the controlling of the actuator to apply the braking force is further in response to determining that a velocity of the crosshead is at least a threshold velocity.

17. The method as defined in claim 11, wherein the controlling of the actuator to apply the braking force comprises controlling the actuator to actuate in an opposite direction of a crosshead velocity.

18. The method as defined in claim 17, further comprising:
   determining an end goal velocity; and
   in response to determining that the crosshead velocity has reached the end goal velocity, controlling the actuator to remove the braking force.

19. The method as defined in claim 11, further comprising controlling the actuator to move the crosshead to a displacement value observed prior to detecting second force measurement.

20. The method as defined in claim 11, further comprising determining a reference displacement of the crosshead based on a displacement measurement, wherein the controlling of the actuator to apply the braking force is further in response to determining that a difference between a displacement measurement and the reference displacement is more than a threshold.

* * * * *